United States Patent [19]

O'Neill et al.

[11] 4,291,451

[45] Sep. 29, 1981

[54] O-RING TOOL

[76] Inventors: Brian S. O'Neill, 12-I Community Dr.; Clay E. Tully, 216 Community Dr., both of Shillington, Pa. 19607

[21] Appl. No.: 65,879

[22] Filed: Aug. 13, 1979

[51] Int. Cl.[3] ........................ B23P 19/02; B23P 19/08

[52] U.S. Cl. .................................... 29/235; 29/243.52

[58] Field of Search .................. 29/235, 243.5, 243.52; 81/3 R, 185

[56] References Cited

U.S. PATENT DOCUMENTS

| | | | |
|---|---|---|---|
| 464,650 | 12/1891 | Baldwin | 29/235 X |
| 985,803 | 3/1911 | Hodgkinson | 29/235 X |
| 1,069,539 | 8/1913 | Evans | 29/235 |
| 1,803,491 | 5/1931 | Thiry | 29/235 X |
| 1,888,642 | 11/1932 | Tryon | 29/235 X |
| 2,388,309 | 11/1945 | Curtiss | 29/235 X |
| 2,572,215 | 10/1951 | Swart | 29/235 X |
| 2,574,195 | 11/1951 | Sherrick | 29/235 X |
| 2,619,964 | 12/1952 | Thaete | 29/235 X |
| 2,968,864 | 1/1961 | Lee | 29/235 |
| 3,036,371 | 5/1962 | Gray et al. | 29/235 |
| 3,111,749 | 11/1963 | Loxterman | 29/235 |
| 3,115,701 | 12/1963 | Jones | 29/235 X |
| 3,319,325 | 5/1967 | Nessamdar et al. | 29/235 |
| 3,347,083 | 10/1967 | Turpin et al. | 29/235 X |
| 3,581,379 | 1/1971 | Drobilits | 29/235 X |
| 3,604,096 | 9/1971 | Shiroma | 29/235 |
| 3,665,578 | 5/1972 | Jaquette | 29/235 X |
| 3,713,199 | 1/1973 | Jaquette | 29/235 X |
| 3,824,660 | 7/1974 | Lowe | 29/235 X |

FOREIGN PATENT DOCUMENTS

| | | | |
|---|---|---|---|
| 808178 | 1/1937 | France | 29/235 |

*Primary Examiner*—James G. Smith
*Attorney, Agent, or Firm*—Alexis Barron

[57] ABSTRACT

A tool for aiding in the fitting or refitting of elastic O-ring-type seals is provided. The tool includes a plurality of frustoconical sections, each section being especially adapted to be releasably retained on a member to which an O-ring is to be fitted. The sections also interfit so that they can be assembled in end-to-end relationship. Retaining structure for maintaining the sections in assembled form can also be included. Storage cavities may be formed in some of the sections for storing such items as O-rings. The tool is especially adapted for fitting O-rings to faucet valve stems of various sizes.

4 Claims, 5 Drawing Figures

O-RING TOOL

FIELD OF THE INVENTION

This invention relates to a tool that aids in the application of elastic O-rings and is especially useful for applying such O-rings to faucet valve stems.

BACKGROUND OF THE INVENTION

Most basin faucet valves that are used today in the home and elsewhere have a movable valve stem that carries a valve surface for opening and closing a valve port to allow water to enter the faucet. Commonly, such valve stems move vertically by reason of a screw thread arrangement cooperative between the valve stem and a gland nut or housing that mounts the valve stem in the faucet or valve housing. The faucet handle is attached to the valve stem and rotation of that handle causes the valve stem to be moved between open and closed positions. In order to prevent the passage of water between the valve stem and the gland nut, it is common to provide a seal between the gland nut and the valve stem. In most instances, this seal is a conventional elastic, rubber or neoprene O-ring.

After the faucet has been used for several years, it is common for the O-ring to deteriorate or wear to the point where the O-ring no longer provides an adequate seal and water will leak past the O-ring and up the valve stem and flow from the faucet housing, thereby wasting water and requiring frequent clean-up.

In order to replace the O-ring, the gland nut is removed from the faucet housing, the old O-ring removed and another installed in its place. However, much time is spent in applying the O-ring because the bottom portion of the valve stem usually forms a laterally extending washer cup or valve surface and the O-ring must be stretched over this cup or surface and thereafter positioned in a retaining groove in the valve stem. This can be a time-consuming and frustrating experience for the installer because many times difficulties are experienced in stretching the O-ring sufficiently to have it pass over the end of the valve stem.

Conical surfaces for stretching and applying O-rings, usually under industrial conditions, have been previously proposed. However, such apparatus are not suitable for use by people in the field, such as plumbers, for replacing or refitting O-rings.

SUMMARY OF THE INVENTION

It is an object of the invention to provide a tool for use in the field for aiding in the fitting of elastic O-rings.

It is further an object of the invention to provide an O-ring expansion tool that is usable for applying different sized O-rings to different sized O-ring receiving members.

The invention comprises a plurality of frustoconical sections, assemblable in end-to-end relationship, with each succeeding section being of larger maximum diameter than the preceding section. Each section includes a means for securing that section to an O-ring receiving member such as a valve stem. A retaining means may be provided for maintaining the sections in assembled form for storage. Several of the sections may include storage cavities. An additional storage member may be provided.

DESCRIPTION OF THE PREFERRED EMBODIMENT

Figure 1:
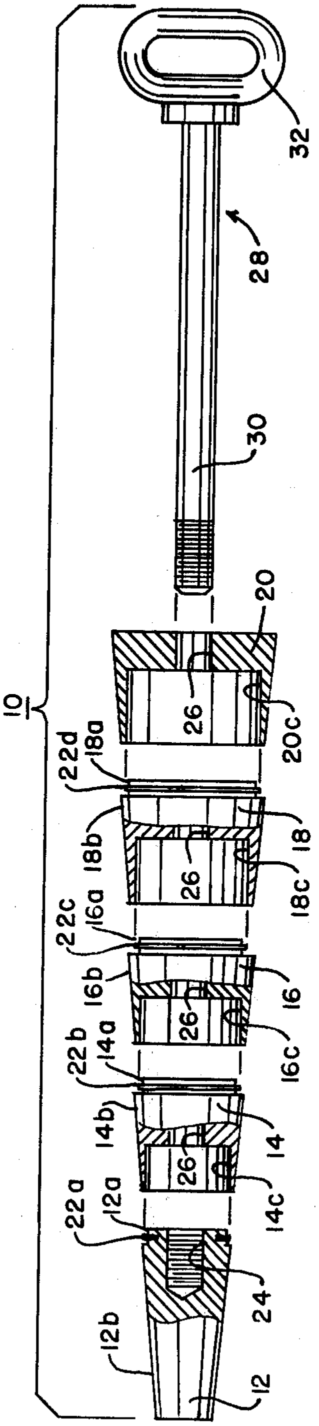
FIG. 1 is a side view, exploded and in partial section, showing a preferred embodiment of a tool in accordance with the invention.
Figure 2:
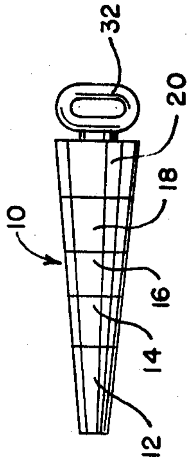
FIG. 2 shows the tool in assembled form.

FIG. 1 shows a tool 10 that comprises a plurality of generally frustoconical sections 12, 14, 16 and 18 formed of a rigid material, such as steel. The number of sections is immaterial to the invention, but it has been found preferable to have a tip section 12, an end section 18, and one or more intermediate sections 14 and 16. The sections are designed to interfit so that, when assembled, they form a unitary, elongate, tapered body as shown in FIG. 2. Thus, preferably, the taper of all the frustoconical sections is substantially the same, preferably on the order of 15°, and the sections are arranged so that the maximum diameter at the base of each section is substantially equal to the minimum diameter of the next succeeding section. By reason of this construction, the conical surfaces **12*b*, 14*b*, 16*b* and 18*b*, when the sections are assembled, form a continuous conical surface as shown in FIG. 2**.

Figure 3:
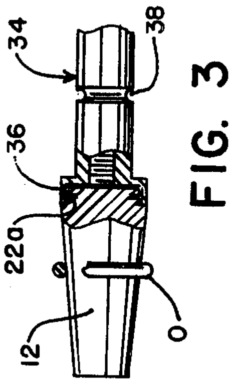
FIG. 3 shows one section of the tool associated with a typical valve stem and positioned for applying an O-ring.
Figure 4:
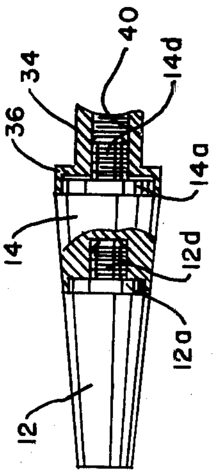
FIG. 4 shows another arrangement for securing the sections of the tool together and for securing the sections to an O-ring receiving member such as a valve stem.

Each of the sections 12, 14, 16 and 18 includes means for securing the section onto a member that is to receive an elastic O-ring, for example, a faucet valve stem 34 (FIGS. 3 and 4). The particular securing means used can take many forms. Referring to FIG. 1, each section 12, 14, 16 and 18 can have an undercut portion **12*a*, 14*a*, 16*a* and 18*a* at its base end. The diameter of the undercut portion can be sized so as to give a friction or interference fit with the particular washer cup 36 (FIG. 3) and with the inside diameters of the cavities 14*c*, 16*c*, 18*c* or 20*c* formed in the top portions of sections 14, 16, 18 and 20 of the tool. However, such a securing means is subject to wear and requires relatively close machining tolerances and therefore it is desirable to incorporate means for generating a holding force, such as split spring rings 22*a*, 22*b*, 22*c* and 22*d*, on the undercut portions of the sections 12, 14, 16 and 18 respectively. Such rings would be split and thus capable of being collapsed inwardly somewhat to generate a radially outwardly directed spring force, directed against the side walls of the washer cup, for holding the section onto the valve stem 34. Also, the spring rings 22*a–d* could also perform the function of holding the sections together in assembled relationship by reason of the bias applied by the spring against the interior diameters of the cylindrical cavities 14*c*, 16*c*, 18*c* and 20*c*. The function of the spring rings 22*a–d* could also be performed by O-rings that are retained by grooves in the undercut portions 12*a*, 14*a*, 16*a* and 18*a***.

Referring to FIG. 1, an arrangement that has been found particularly useful for holding the sections together comprises a holder or retaining means 38 that comprises a shaft 30 that is threaded at its distal end and that has an enlarged handle 32 at the other end. Each of the sections 14, 16 and 18 and the cavity member 20 includes a substantially centrally located bore 26. The shaft 30 can pass through the bores 26 and be received in the threaded blind bore 24 in the first section 12. The tool is held in assembled relationship by slipping the sections 14, 16, 18 and member 20 over the shaft and then retaining the sections on the shaft by means of the first section 12, thereby forming an assembly, as shown in FIG. 2. In this way, the tool is convenient to store and carry and the retaining system aids in preventing the sections from being lost.

As previously noted, each of the sections 14, 16 and 18 (FIG. 1) may be provided with internal cavities 14*c*, 16*c* and 18*c*. The various cavities can be used for holding several O-rings, it being preferable to segregate the O-rings according to size in the various cavities. Further, an additional storage element 20 with a cavity 20*c* can also be provided for storing large size O-rings that are applied by the tool section 18 that has the largest outside diameter at its base. Therefore, the repairman also has associated with the tool convenient storage for an adequate number of O-rings.

FIG. 3 illustrates the tool in use. In this case, the first section 12 has been disassembled from the other sections and has been associated with a valve stem 34. The undercut portion of the section carrying the split ring 22*a* has been pushed into the valve cup and is retained in position for the engagement of the ring 22*a* with the side surfaces of the valve cup 36. An O-ring O of the appropriate size is placed over the small diameter end of the section 12 and is rolled up the tapered surface, over the cup 36 and is simultaneously expanded as it is moved along the section. After the O-ring has passed over the cup 36, it contracts to a smaller size and can be rolled in a similar fashion along the shaft until it is positioned in the retaining groove 38. For some O-rings, it may be desirable to employ more than one section of the tool, as shown in FIG. 4, for applying the O-ring, especially if the O-ring is a relatively "stiff" one, i.e., one that does not expand readily.

FIG. 4 shows an alternate means for securing the sections to a valve stem and also to each other. In this arrangement, each section includes a threaded stud 12*d*, 14*d*, etc. The stud is sized and threaded so that it can be received in the threaded bore that is usually present in the end of most cup-type valve stems for receiving the screw that retains the washer on the valve stem. All that is necessary to retain one or more of the sections on the valve stem is to thread the stud into the bore 40 to draw the undercut portion 14*a* into the cup 36. In this arrangement, succeeding sections 14, 16 and 18 of the tool can include a suitably sized blind bore for receiving the stud of the preceding section. In this manner, all of the sections of the tool can be maintained together when the tool is not in use.

Figure 5:
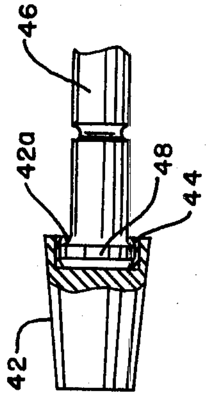
FIG. 5 illustrates another embodiment of the invention for applying O-rings to another type of valve stem.

The tool can also be used for applying O-rings to the relatively new poppet-type faucet valve stems. One such arrangement is shown in FIG. 5. Here each section 42 includes a substantially cylindrical recess or cavity 42*a* at its bottom end that is sized to receive the head 48 that is formed as an integral part of the valve stem 46. In order to ensure retention of section 42 on the valve stem, an annulus or bank of resilient, readily deformable material such as rubber or an elastomeric foam is fixed in place in recess 42*a*. In this arrangement, the sections are used in the same manner as illustrated in connection with FIG. 3. However, it should be realized that each succeeding section to section 42*a* includes a reduced diameter portion at its top end to fit into the cavity 42*a* so that several sections can be assembled and held together to form a complete tool of several differently sized sections.

As an added convenience, the tool can also include means for aiding in the removal of old O-rings. Such a means can comprise a sharpened or pointed part disposed on the distal end of the shaft 30, beyond the threads. The pointed portion can also include a sharpened blade edge extending back from the sharpened point. The sharpened point is inserted under the old O-ring, and as the point is advanced between the O-ring and the stem, the blade cuts through the O-ring. In this instance the bore 24 of the lead section 12 would have to be extended somewhat beyond the portion in order to receive the pointed cutting end of the shaft 30.

We claim:

1. A tool for mounting elastic rings comprising:

a plurality of generally frustoconical sections, each section having a base portion and a top portion opposite the base portion;

means adjacent the base of each section for securing the section on a member adapted to receive an elastic O-ring;

interfitting means for joining the sections together;

retainer means for releasably holding the section in assembled relationship;

wherein at least one of the sections includes a longitudinal passageway extending therethrough and the retainer means comprises an elongate member extending through the passageway; and means for holding the section on the elongate member.

2. A tool as in claim 1 wherein said holding means comprise one of the frustoconical sections.

3. A tool as in claim 1 and further comprising an auxiliary section defining a storage compartment.

4. A tool comprising:

a plurality of substantially frustoconical sections, each section having a small diameter end and a large diameter end, each section including means at its large diameter end for associating the section with a member adapted to receive an elastic O-ring;

means for releasably securing the sections together in end-to-end relationship;

wherein the sections comprise a tip section, an end section and at least one intermediate section, the end and intermediate sections having longitudinally extending passageways, and wherein the securing means comprise a retaining base and an elongate member extending outwardly from the retaining base and adapted to pass through the longitudinally extending passageways, and the tip section including means for fixedly securing the tip section on an end portion of the elongate member.

* * * * *